Jan. 16, 1962
T. J. BULAT ETAL
3,017,342
OIL SEPARATION PROCESS
Filed Sept. 5, 1958
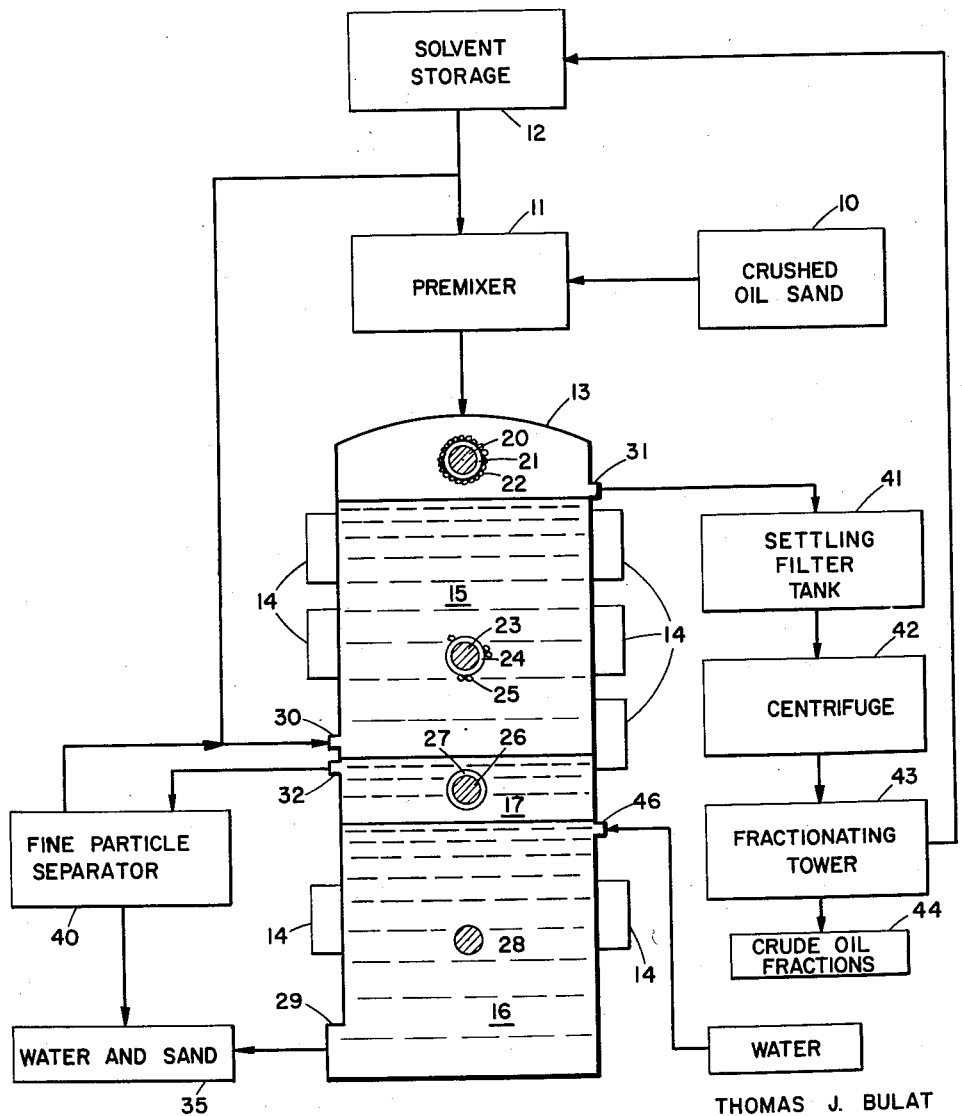
THOMAS J. BULAT
PAUL F. KUSY
JAMES R. LOGAN
INVENTORS
BY *Grover G. Frater*
ATTORNEY

United States Patent Office 3,017,342
Patented Jan. 16, 1962

3,017,342
OIL SEPARATION PROCESS
Thomas J. Bulat, Davenport, Iowa, James R. Logan, Rock Island, and Paul F. Kusy, Moline, Ill., assignors to The Bendix Corporation, a corporation of Delaware
Filed Sept. 5, 1958, Ser. No. 759,341
5 Claims. (Cl. 208—11)

This invention relates to oil separation and in particular to the separation of crude oil from oil bearing media or mineral matter such for example as sand, shale, clay and similar substances in which oil occurs.

One object of the invention is to provide a novel improved process for such oil separation.

Much of the world's crude oil is found in deposits where it is mixed with sand, shale, clay and similar substances. The crude oil in many of these deposits includes substantial proportions of the heavier petroleum fractions, such asphaltines, which are difficult to separate from the sand, shale, and clay media. This difficulty extends to the lighter fractions as well for these, being joined in solution with the heavier fractions and for a number of practical reasons including good natural resource conservation practice, must be removed by removal with the heavier fractions. The problem is further complicated by the fact that these crude oil deposits vary, within themselves, in percentage of oil content, proportion of the various fractions contained, amount of included water, and in composition of the oil bearing media.

Another object of the invention is to provide a process whose basic steps not only insure economical oil separation but are capable of modification to make them compatible with a wide variety of variable conditions in the oil bearing media whereby the process remains economically feasible for a wide variety of media and crude oil composition.

Another object of the invention is to provide a process which may be practiced on a continuous process basis in a closed system to insure maximum control over variable conditions and in which oil recovery is complete. This latter feature is important to the conservation of oil reserves and in disposal of the media from which the oil is taken.

Another object is to provide a process which includes the already developed art of hydrocarbon fractionating thus to employ to a large extent, well known techniques and practices.

The invention is well suited to the separation of oil from tar sand such for example as Athabasca tar sands of the Province of Alberta, Canada, and another object of the invention is the provision of a novel method for this purpose.

Sonic energy is employed in the invention to activate a body of solvent for the oil in which the oil bearing media is immersed. The solvent is made to float on a second body of non-solvent liquid; the oil bearing media being moved down through the solvent into the second liquid body whereby the media is separated from its oil and solvent.

It is a feature of the invention that steps are taught for substantial recovery of the solvent and a related object of the invention is to provide a method for recovering solvent carried by the media into the second liquid body and from the oil.

One of the problems encountered in oil separation by solvents is the difficulty of removing fine particles of media which are suspended in the oil and another object is to provide a method for effective separation of these suspended particles.

Another purpose is to provide a process of substantially constant efficiency thus to enable maximum utilization of the processing apparatus.

The accompanying drawing illustrates, in a diagrammatic flow chart, apparatus for practicing the invention applied to the separation of oil from tar sands, it being understood that various modifications may be made in the apparatus shown and in the method employed without departing from the spirit of the invention or the scope of the appended claims.

In the invention, oil bearing media is immersed in a body of solvent for the oil. The solvent is sonically activated, advantageously to cavitate the liquid solvent, for rapid separation of the oil from the media. The media is then removed to a second body of liquid where any oil and solvent remaining with the media is substantially separated therefrom. The second liquid is advantageously a non-solvent for the oil and solvent and has a specific gravity different than the oil and solvent whereby they will be separated by gravity.

Residing in the same container, one of these liquids, either the solvent or the second liquid, will float on the other. Advantageously, the solvent has the lower specific gravity whereby it will float on the second body of liquid and the media may be moved, as by being dropped, through both bodies of liquid.

The combination of a solvent floating on a non-solvent, the whole being sonically activated, has several unexpected and very advantageous results. The crude oil contains a wide range of fractions united in solution and is "soluble" in light petroleum fractions such for example as kerosene, benzene, fuel oils and others, and both the oil and these solvents are insoluble in and lighter in weight than certain other liquids such, for example, as water. The oil bearing media is moved first through the solvent and then the non-solvent; the latter being heavier provides the immediate advantage that gravity may be utilized to move the oil bearing media through the liquids. The media may simply be dropped into the solvent and allowed to free fall through the solvent and non-solvent. The oil will be dissolved in the solvent so that as the particles of media move into the non-solvent layer they carry with them not oil but only a coating of solvent. The solvent layer will contain some dissolved oil but is substantially a single substance which can be removed from the media particles by a sonic action, control of the acidity of the non-solvent liquid and other simple expedients. Once removed from the media particles, the solvent floats upward through the non-solvent to rejoin the body of solvent floating above.

It is a further feature of the invention that when properly selected the solvent and non-solvent liquids are emulsified as the result of the sonic activation to form a layer of emulsion at their interface. Particles of the media, which are so fine that they would settle down through the liquids very slowly and thus build up in quantity and eventually necessitate slowing the rate of media movement, are caught in suspension in the emulsified layer and may be drawn off.

Ordinarily, it is said, when substances are joined in solution, that the heavier substance is soluble and dissolved in the lighter one. Then it is not precise to say that the crude oil is dissolved in a light petroleum fraction. If the crude oil contains an asphaltine and pentane and the light fraction solvent is number 2 furnace oil, then the asphaltine is dissolved in the solvent, and both are dissolved in the pentane. However, for the sake of clarity and consistent with common usage, it will be said that the crude oil is dissolved in the solvent despite the fact that the term solvent is used to include petroleum fractions which have lower boiling points and are heavier than some of the fractions contained in the crude oil.

While it is possible to practice the invention with any of a wide range of light petroleum fractions as the solvent, fuel oils have been found best for general separation and especially for separating oil from the Athabasca tar sands. The fuel oils have a flash point sufficiently high so that they can be employed at elevated temperatures with safety and are sufficiently light so that the solution of crude oil and solvent is viscous enough for very easy processing. Advantageously, the solvent is number two furnace oil.

The non-solvent is preferably water. It is preferred because of its low cost, because it creates an emulsion with the furnace oil when sonically activated, and because it does not present any problem in connection with water which might be present in the oil bearing media. In most instances where crude oil is mixed in sand, shale or clay, water is present. It forms a thin covering layer adjacent particles of the media and the crude oil covers the water layer as represented in the drawing.

Advantageously the oil bearing media is crushed and premixed with solvent prior to the sonic separation step. The premixing lowers the viscosity and specific gravity of the oil bearing mass, begins deagglomeration and contributes to fluidity of the mass for ease in transfer to the sonic separation stage which has been described.

The problem of providing fresh solvent is simplified when a petroleum fraction is used. The solution of crude oil and solvent must be separated into its various fractions as by fractional distillation and fresh solvent is recovered as a distillation product.

One example of the method follows, reference being made to the accompanying drawing in which the oil bearing media selected for illustration is sand.

Crushed oil sand at 10 is conveyed to a premixer 11 wherein fresh solvent from storage container 12 is added to the oil sand and the whole mixed as by mechanical agitation. Sonic energy to be applied in a next step is capable of complete deagglomeration of the crushed oil sand but the premixing step is preferably employed for initial deagglomeration for which the sonic action is not required.

Advantageously the sonic separation step is conducted in a column of liquid through which the oil sand solvent slurry is allowed to free fall. Such a column of liquid is shown in the separating tower 13 which has a plurality of sonic transducers 14 attached in sonic wave transmitting relation to its side walls whereby sonic waves will be transmitted to the liquid when the transducers are energized.

The liquid column comprises an upper column 15 of the solvent number two furnace oil 15, and a lower column 16 of water. Sonic energy transmitted to the liquid causes the solvent and water to emulsify at their interface providing a layer of emulsion 17 between them.

Slurry from the premixer 11 is introduced into the separating tower 13 at its upper end and is allowed to fall down through the liquid. Four grains of sand are shown to illustrate the oil removal action as the sand falls through the tower 13. The upper sand grain 20, before it enters the liquid column, is surrounded by a water film 21 which in turn is surrounded by a layer 22 of crude oil together with solvent added in the premixing stage.

A lower sand grain 23 in the solvent column 15 and subjected to sonic action retains its insoluble water film 24 but its crude oil layer 25 is almost all dissolved by the solvent. A third sand grain 26, having reached the emulsion layer 17, retains its water film 27 but no crude oil layer remains. The lowest grain 28 is simply a clean sand grain in the water column. The sand collected at the bottom of tower 13 and removed by way of an outlet 29 out of the tower to a place 35.

Use of the tower 13 makes continuous processing convenient. A fresh supply of solvent is insured by flowing solvent from container 12 to an inlet 30 in tower 13 near the bottom of the solvent column 15. The flow of solvent is counter to the sand movement and, together with the dissolved crude oil, is drawn from the tower at an overflow outlet 31.

Many of the fine sand and clay particles which would settle down through the tower very slowly, are caught and held in suspension in the emulsion layer 17. These are drawn from the tower at a tap 32 and transported with emulsion to a fine particle separator 40. Separator 40 may comprise any convenient means such as a centrifuge or sonic separator for separating the sand and water, which are sent to the discharge point 35, from the solvent and any dissolved crude oil which are returned to the tower through inlet 30.

The solution of crude oil and solvent is removed from the tower through overflow outlet 31 and is introduced to a settling and filter tank 41 to remove leaves, wood chips and like matter introduced into the system with the oil sand together with much of any fine sand or clay not cause by the emulsion layer 17. Any fine, solid mineral particles remaining are then removed by passing the solvent and crude oil from the tank 41 to a centrifuge 42. From the centrifuge 42 the crude oil and solvent are sent to a fratcionating tower 43 where the solvent fraction is recovered and sent back to the storage container 12. Other fractions are sent to storage container 44.

Water to replace that removed at outlet 29 with the sand is added through an inlet 46.

The oil separation is greatly accelerated by sonic activation of the solvent and this is especially true when the degree of activation is sufficient to cause cavitation in the solvent. The transducers may comprise any apparatus by which sonic energy can be applied to the solvent. The transducers 14 comprise magnetostrictive units electrically energized by alternating current at their resonant frequency which may or may not be in an audible range. Advantageously, however, the transducers are energized by alternating current whose frequency is near ten thousand cycles per second. The frequency of commercially available 10 kc. rotary generators is very satisfactory and such generators are advantageously employed.

If the water in column 16 is slightly acidic the removal from the sand of any oil or solvent still adhering to the sand particles will be facilitated and this oil is removed and will float upward to rejoin the column 15. On the other hand, it will aid in settling the sand particles through the emulsion layer 17 if this layer is basic. Accordingly the pH of the water and solvent may be controlled by additives to meet the conditions and to accommodate changing conditions in the oil sands without need to modify the mechanical arrangement of the tower and the height of the liquid columns.

The height of the water column is not critical since its purpose is to facilitate separation of the sand and solvent without drag-out of solvent. The height of the solvent column must be great enough so that the oil sands are subjected to sonic activity for a long enough period to effect separation of the crude oil from the sand. It has been found entirely possible to effect the separation in seconds and fractions of seconds with reasonable amounts of sonic power. The required solvent column height is readily determined by workers in the art and the dimensions are entirely within practical limits.

This example has been given as an illustration, it being understood that other examples of the method are possible within the spirit of the invention and the scope of the appended claims.

We claim:

1. The method of separating oil from oil bearing mineral matter which comprises premixing the oil bearing mineral matter with a solvent for oil having specific gravity less than that of water and being insoluble in water; moving the premix in free fall through a body of solvent for oil floating on water and insoluble in water down through said solvent body and said water; sonically activating said solvent body in a degree sufficient to result in cavitation therein while moving said media through said body of solvent.

2. The invention defined in claim 1 in which said solvent in fuel oil and said sonic activation is sufficient to emulsify said fuel oil and water at their interface, and including the further step of continually withdrawing emulsion from said interface.

3. The method of separating oil from oil bearing mineral matter which comprises moving the oil bearing mineral matter in free fall through a body of solvent for the oil into a body of water while sonically cavitating the solvent.

4. The invention defined in claim 3 in which the body of water is sonically activated and basic.

5. The invention defined in claim 3 in which the interface between the solvent and water is sonically activated in a degree sufficient to produce a water and solvent emulsion at said interface.

References Cited in the file of this patent

UNITED STATES PATENTS

| | | |
|---|---|---|
| 1,487,541 | Coogan | Mar. 18, 1924 |
| 1,497,607 | Streppel | June 10, 1924 |
| 2,009,366 | Wait | July 23, 1935 |
| 2,453,060 | Bauer et al. | Nov. 2, 1948 |
| 2,722,498 | Morrell et al. | Nov. 1, 1955 |
| 2,871,180 | Lowman et al. | Jan. 27, 1959 |
| 2,973,312 | Logan | Feb. 28, 1961 |